(12) United States Patent
Ryu (10) Patent No.: US 9,685,197 B2
(45) Date of Patent: Jun. 20, 2017

(54) METHOD FOR GENERATING THUMBNAIL AND ELECTRONIC DEVICE THEREOF

(71) Applicant: Samsung Electronics Co., Ltd., Gyeonggi-do (KR)

(72) Inventor: Kwang-Yuel Ryu, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/671,383

(22) Filed: Mar. 27, 2015

(65) Prior Publication Data

US 2015/0279428 A1 Oct. 1, 2015

(30) Foreign Application Priority Data

Mar. 27, 2014 (KR) ........................ 10-2014-0035952

(51) Int. Cl.
*G11B 27/28* (2006.01)
*G11B 27/031* (2006.01)
*G06K 9/00* (2006.01)

(52) U.S. Cl.
CPC .......... *G11B 27/28* (2013.01); *G06K 9/00751* (2013.01); *G11B 27/031* (2013.01)

(58) Field of Classification Search
CPC ........... H04N 21/4622; H04N 21/4722; H04N 21/4325; H04N 21/8133; H04N 21/8455; G11B 27/28; G11B 27/031; G06K 9/46
See application file for complete search history.

(56) References Cited

U.S. PATENT DOCUMENTS

| 7,751,683 | B1* | 7/2010 | Belknap | G06F 17/30843 348/700 |
| 2004/0197071 | A1* | 10/2004 | Zhang | G06F 17/30843 386/264 |
| 2005/0060641 | A1* | 3/2005 | Sezan | H04L 12/2805 715/202 |
| 2015/0146988 | A1* | 5/2015 | Oami | H04N 5/232 382/197 |

FOREIGN PATENT DOCUMENTS

| EP | 1-465-196 | 6/2004 |
| EP | 1-909-195 | 9/2008 |

OTHER PUBLICATIONS

Hong Liu et at., A Segmentation and Graph-Based Video Sequence Matching Method for Video Copy Detection.
IEEE Transactions on Knowledge and Data Engineering vol. 25, No. 8, Aug. 2013.

* cited by examiner

*Primary Examiner* — Huy T Nguyen
(74) *Attorney, Agent, or Firm* — The Farrell Law Firm, P.C.

(57) ABSTRACT

A method and apparatus for generating a thumbnail of a video content in an electronic device is provided. The method for generating the thumbnail of the video content in the electronic device includes dividing a video content into a plurality of pieces, extracting a characteristic point of each of the plurality of pieces, comparing the characteristic point of each of the plurality of pieces and a characteristic point of each of a plurality of pieces of at least one other video content, and determining a thumbnail of the video content from a piece of the video content that is not the same as a piece of the at least one other video content, based on a result of the comparing.

18 Claims, 8 Drawing Sheets

METHOD FOR GENERATING THUMBNAIL AND ELECTRONIC DEVICE THEREOF

PRIORITY

This application claims priority under 35 U.S.C. §119(a) to a Korean Patent Application filed in the Korean Intellectual Property Office on Mar. 27, 2014 and assigned Serial No. 10-2014-0035952, the contents of which are incorporated herein by reference.

BACKGROUND

1. Field of the Invention

The present invention relates generally to an apparatus and method for generating a thumbnail of a video content in an electronic device.

2. Description of the Related Art

With the development of multimedia technology, multimedia contents are increasingly being used. As large amounts of data can be transmitted and received at high speeds in electronic devices in recent years, large files containing visual content, such as moving image data, are increasingly used in electronic devices. Therefore, there is a need for a method for easily managing multimedia contents in an electronic device.

As the use of the multimedia contents increases, the electronic device may display identifiers for identifying multimedia contents, in addition to file names, so that the user of the electronic device can identify the plurality of multimedia contents. For example, the electronic device may provide a first frame of a moving image as a thumbnail image. In another example, the electronic device may provide as a thumbnail image, a frame of a moving image displayed after a reference point of time from a start point of time of the moving image.

Figure 7A:
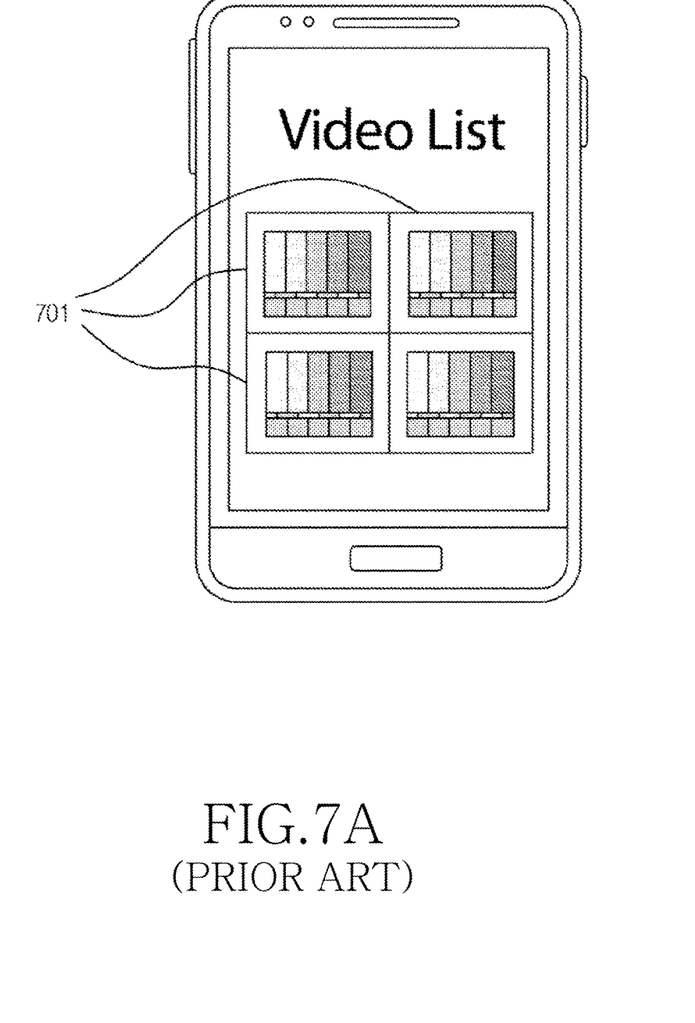
FIG. 7A illustrates a screen of an electronic device on which the same thumbnail images are generated for a series of video contents, according to the conventional art.

FIG. 7A illustrates a screen of an electronic device on which the same thumbnail images are generated for a series of video contents, according to the conventional art.

Referring to FIG. 7A, an electronic device, according to the conventional art, may provide an image based on a predetermined condition as a thumbnail image. For example, the electronic device may provide the same thumbnail image 701 for each of a series of video contents including the same beginning image frame. Accordingly, there is a need for a method for a user to easily identify a video in an electronic device by using different thumbnail images.

SUMMARY

The present invention has been made to address at least the above-mentioned problems and/or disadvantages and to provide at least the advantages described above.

In accordance with an aspect of the present invention, there is provided a method for generating a thumbnail of a video content in an electronic device. The method includes dividing a video content into a plurality of pieces, extracting a characteristic point of each of the plurality of pieces, comparing the characteristic point of each of the plurality of pieces and a characteristic point of each of a plurality of pieces of at least one other video content, and determining a thumbnail of the video content from a piece of the video content that is not the same as a piece of the at least one other video content, based on a result of the comparing.

In accordance with another aspect of the present invention, there is provided an electronic device for generating a thumbnail of a video content. The electronic device includes a memory and one or more processors. The one or more processors is configured to control to divide a video content into a plurality of pieces, extract a characteristic point of each of the plurality of pieces, compare the characteristic point of each of the plurality of pieces and a characteristic point of each of a plurality of pieces of at least one other video content, and determine a thumbnail of the video content from a piece of the video content that is not the same as a piece of the at least one other video content, based on a result of the comparing.

BRIEF DESCRIPTION OF THE DRAWINGS

The above and other aspects, features, and advantages of embodiments of the present invention will be more apparent from the following description taken in conjunction with the accompanying drawings, in which.

DETAILED DESCRIPTION OF EMBODIMENTS OF THE PRESENT INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness. In the following description, the same or similar reference numerals are used to designate the same or similar elements.

In the following description, the expressions "include" or "may include" refer to the existence of a corresponding function, operation, or element, and does not limit one or more additional functions, operations, or elements. Also, as used herein, the terms "include" and/or "have" should be construed to denote existence of a certain feature, number, step, operation, element, component or a combination thereof, and should not be construed to exclude the existence or possible addition of one or more other features, numbers, steps, operations, elements, components, or combinations thereof.

Also, as used herein, the expression "or" includes any or all combinations of words enumerated together. For example, the expression "A or B" may include A, may include B, or may include both A and B.

Herein, the expressions "a first", "a second", "the first", "the second", and the like may modify various elements, but the corresponding elements are not limited by these expressions. For example, the above expressions do not limit the sequence and/or importance of the corresponding elements. The above expressions may be used merely for the purpose of distinguishing one element from other elements. For example, a first user device and a second user device indicate different user devices although both are user devices. For example, a first element may be referred to as a second element, and similarly, a second element may be referred to as a first element without departing from the scope of the embodiments of the present invention.

When an element is referred to as being "coupled" or "connected" to any other element, it should be understood that not only the element may be directly coupled or connected to the other element, but also a third element may be interposed between the two elements. By contrast, when an element is referred to as being "directly coupled" or "directly connected" to any other element, it should be understood that no other element is interposed between the two elements.

The terms used in the following description are used to describe specific embodiments, and are not intended to limit embodiments of the present invention. As used herein, the singular forms are intended to include the plural forms as well, unless the context clearly indicates otherwise.

Unless defined otherwise, all terms used herein, including technical and scientific terms, have the same meaning as those commonly understood by a person of ordinary skill in the art to which the embodiments of the present invention pertain. Such terms as those defined in a generally used dictionary are to be interpreted to have definitions equivalent to the contextual definitions in the relevant field of the art, and are not to be interpreted to have ideal or excessively formal meanings unless clearly defined herein.

An electronic device according to various embodiments may include one or a combination of various devices, including a smartphone, a tablet Personal Computer (PC), a mobile phone, a video phone, an electronic book reader, a desktop PC, a laptop PC, a netbook computer, a Personal Digital Assistant (PDA), a Portable Multimedia Player (PMP), a Motion Picture Experts Group (MPEG) Audio Layer 3 (MP3) player, a mobile medical machine, an electronic bracelet, an electronic necklace, an electronic accessory, a camera, a wearable device, an electronic clock, a wrist watch, a smart appliance (e.g., a refrigerator, an air conditioner, a cleaner, an artificial intelligence robot, a TeleVision (TV), a Digital Video Disk (DVD) player, a stereo, an oven, a microwave oven, a washing machine, an air cleaner, and an electronic album), various medical machines (e.g., Magnetic Resonance Angiography (MRA), Magnetic Resonance Imaging (MRI), Computed Tomography (CT), a tomograph, and an ultrasound machine), a navigation device, a Global Positioning System (GPS) receiver, an Event Data Recoder (EDR), a Flight Data Recorder (FDR), a set-top box, a TV box (e.g., Samsung HomeSync™, Apple TV™, or Goggle TV™), an electronic dictionary, an automotive infotainment device, electronic equipment for ships (e.g., navigation equipment for ships and a gyro compass), avionics, a security device, electronic clothing, an electronic key, a camcorder, a game console, a Head-Mounted Display (HMD), a flat panel display device, an electronic album, a part of furniture or a building/structure equipped with a communication function, an electronic board, an electronic signature receiving device, and a projector. In addition, it is obvious to a person of ordinary skill in the related art that the electronic device according to various embodiments is not limited to the above-mentioned devices.

Figure 1:
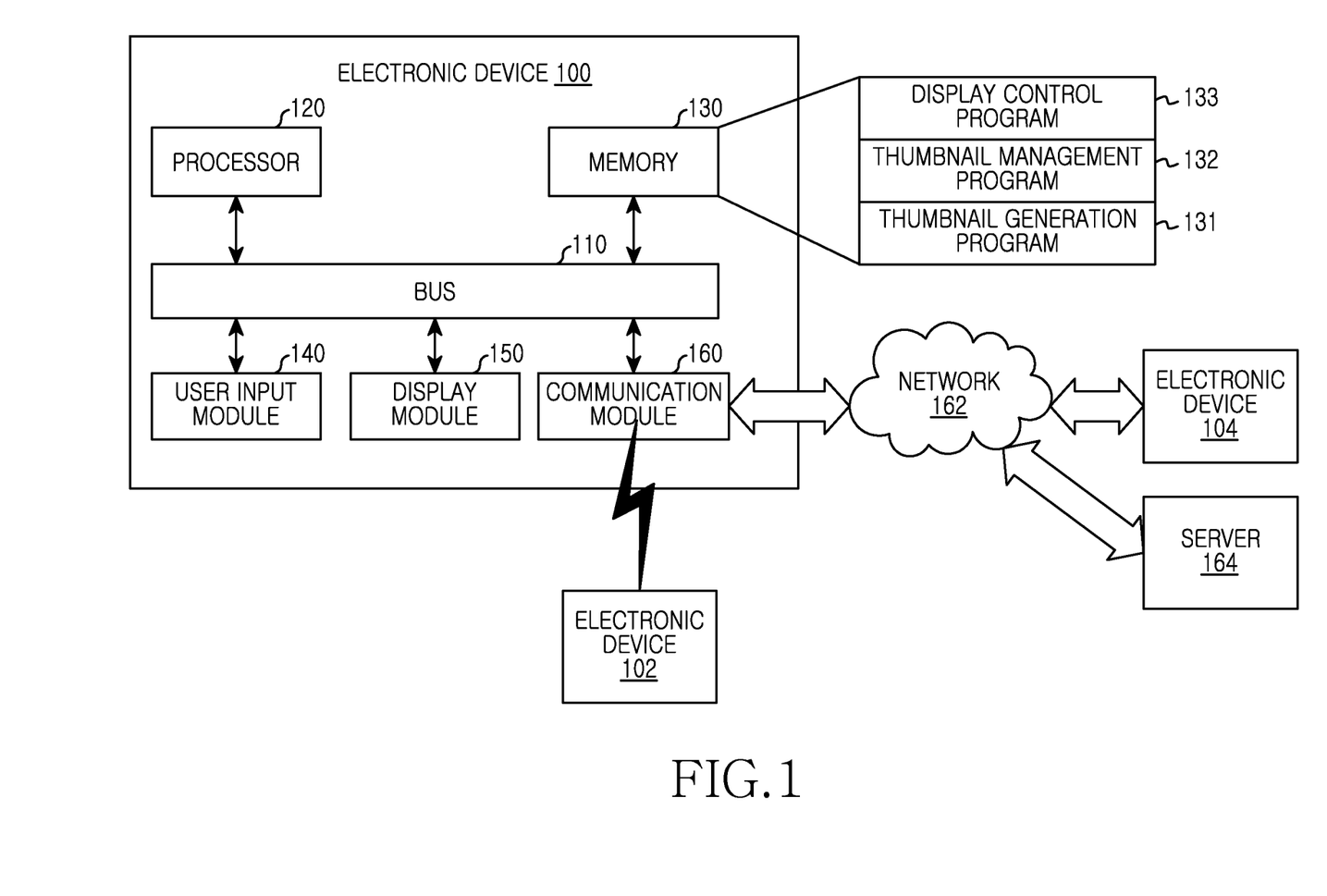
FIG. 1 is a block diagram illustrating an electronic device, according to an embodiment of the present invention.

FIG. 1 is a block diagram illustrating an electronic device, according to an embodiment of the present invention.

Referring to FIG. 1, the electronic device 100 includes a bus 110, a processor 120, a memory 130, a user input module 140, a display module 150, and a communication module 160.

The bus 110 is a circuit which connects the elements (e.g., the bus 110, the processor 120, the memory 130, the user input module 140, the display module 150, and the communication module (160)) included in the electronic device 100 with one another, and transmits communication (e.g., a control message) between the elements.

Figure 2:
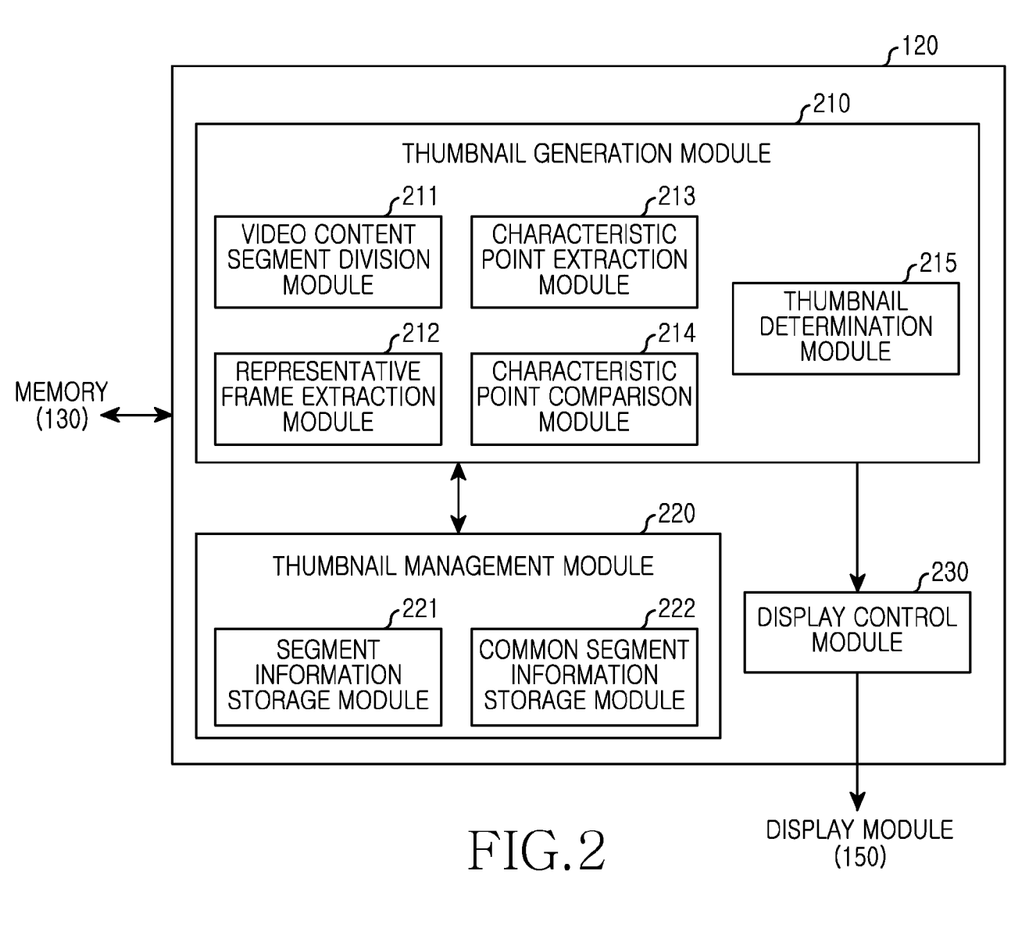
FIG. 2 is a detailed block diagram illustrating a processor of an electronic terminal, according to an embodiment of the present invention.

The processor 120 receives instructions from the elements included in the electronic device 100 via the bus 110, deciphers the instructions, and performs calculation or data processing according to the deciphered instructions. In this case, the processor 120 executes at least one program stored in the memory 130 and controls to provide a service according to the corresponding program. The processor 120 may be configured, as shown in FIG. 2, to generate a thumbnail of a video content by executing a thumbnail generation program 131, a thumbnail management program 132, and a display control program 133.

In addition, the processor 120 may include one or more Application Processors (APs) or one or more Communication Processors (CPs). The AP and the CP may be included in the processor 120 or may be included in different Integrated Circuit (IC) packages. In addition, the AP and the CP may be included in a single IC package. The AP controls a plurality of hardware or software elements connected to the AP by driving an operation system or an application program, and processes and calculates various data including multimedia data. The AP is implemented by using a System On chip (SoC). In addition, the CP may perform at least some of the multimedia control functions. In addition, the CP may distinguish and authenticate a terminal in a communication network by using at least one subscriber identification module (e.g., a Subscriber Identity Module (SIM) card). In this case, the CP may provide a service including a voice call, a video call, a text message, or packet data to a user. In addition, the CP may control data exchange of the communication module 160. The AP or the CP may load instructions or data received from a non-volatile memory connected thereto or at least one of the other elements into a volatile memory, and may process the instructions or data. In addition, the AP or the CP may store data which is received from at least one of the other elements or generated by at least one of the other elements in the non-volatile memory. The CP may manage a data link and convert a communication protocol in communications between the electronic device 100 including hardware and other electronic devices connected via a network. The CP may be implemented by using an SoC. Additionally, the processor 120 may further include a Graphic Processing Unit (GPU).

The memory 130 stores instructions or data which is received from or generated by the processor 120 or the other elements of the electronic device 100 (e.g., the user input module 140, the display module 150, and the communication module 160). In this case, the memory 130 may include an internal buffer and an external buffer. The memory 130 includes at least one of characteristic point information and common segment information. The characteristic point information includes at least one piece of information of a video content ID, a segment ID, a segment start location, a segment finish location, characteristic point information of a segment, and information on whether there is a same segment. The common segment information includes at least one piece of information of a common segment ID, a common segment video content ID, and a common segment video content segment ID.

In addition, the memory 130 includes the thumbnail generation program 131, the thumbnail management program 132, and the display control program 133. Each of the programs may be configured by a programming module and each of the programming modules may be configured by software, firmware, hardware, or a combination thereof.

The thumbnail generation program 131 includes at least one software element for determining a thumbnail of a video content. Additionally, the thumbnail generation program 131 includes a video content segment division program, a representative frame extraction program, a characteristic point extraction program, a characteristic point comparison program, and a thumbnail determination program.

Specifically, the thumbnail generation program 131 divides a video content on a segment basis through the video content segment division program. For example, the video content segment division program divides the video content on the segment basis by dividing the video content into sections each having a same or similar frame with reference to a continuous time axis. The video content segment division program analyzes histograms of the frames and, when a change in the histogram between the frames exceeds a reference range, divides the video content into segments. Additionally, when the video content segment division program divides the entirety of the video content on the segment basis, significant processing time is required. Therefore, the video content segment division program may divide at least a part of the video content into segments.

In addition, the thumbnail generation program 131 extracts a representative frame for each segment through the representative frame extraction program. For example, the representative frame extraction program analyzes the histograms of the frames included in the segment and determines a frame approximating to an average value as a representative frame. In another example, the representative frame extraction program determines an n-th frame from among the frames included in the segment as a representative frame.

In addition, the thumbnail generation program 131 extracts a characteristic point for each of the representative frames through the characteristic point extraction program. For example, the characteristic point extraction program extracts at least one piece of information of an object, a face, and a text existing in each of the representative frames as a characteristic point. The characteristic point extraction program extracts the characteristic point from each of the representative frames by using Scale-Invariant Feature Transform (SIFT) or Speeded Up Robust Features (SURF). Additionally, the characteristic point extraction program stores characteristic point information of each of the representative frames in the memory 130.

In addition, the thumbnail generation program 131 compares the characteristic point of each of the representative frames and a characteristic point of each of the representative frames of another video content through the characteristic point comparison program.

In addition, the thumbnail generation program 131 determines whether common segment information exists through the characteristic point comparison program. When the common segment information exists, the thumbnail generation program 131 compares the characteristic point of each of the representative frames and a characteristic point of each of the representative frames of another video content included in the common segment information. When the characteristic point of each of the representative frames is similar to the characteristic point of each of the representative frames included in the common segment information by more than a predetermined level, the characteristic point comparison program recognizes that the segments are the same. When it is recognized that the segments are the same, the characteristic point comparison program stores information on the corresponding segment in the memory 130.

The thumbnail generation program 131 determines a thumbnail of the video content from a representative frame that is not the same as a representative frame from the other video content based on a result of the comparison.

The thumbnail management program 132 includes at least one software element which controls to store segment information and common segment information accompanied by the generated thumbnail of the video content. Additionally, the thumbnail management program 132 includes a segment information storage program and a common segment information storage program.

The thumbnail management program 132 receives characteristic point information of each of the representative frames from the characteristic point extraction program and stores the same in the memory 130 through the segment information storage module.

In addition, the thumbnail management program 132 receives segment information to be included in the common segment information from the characteristic point comparison program and stores the same in the memory 130 through the common segment information storage program.

The display control program 133 includes at least one software element which controls to display at least one display data through the display module 150. For example, the display control program 133 displays the thumbnail of the video content through the display module 150.

The memory 130 includes an internal memory or an external memory. The internal memory may include at least one of a volatile memory (e.g., a Dynamic Random Access Memory (DRAM), a Static Random Access Memory (SRAM), and a Synchronous DRAM (SDRAM),) and a non-volatile memory (e.g., an One-Time Programmable Read Only Memory (OTPROM), a Programmable Read Only Memory (PROM), an Erasable Programmable Read Only Memory (EPROM), an Electrically Erasable Programmable Read Only Memory (EEPROM), a mask ROM, a flash ROM, a NAND flash memory, and a NOR flash memory). The internal memory may be provided in the form of a Solid State Drive (SSD). The external memory may include at least one of Compact Flash (CF), Secure Digital (SD), Micro-SD, Mini-SD, extreme-Digital (xD), and a memory stick.

In addition, the memory 130 may further include a kernel, middleware, and an Application Programming Interface (API). The kernel controls or manages system resources (e.g., the bus 110, the processor 120, or the memory 130) which are used for performing operations or functions implemented in the other programming modules (e.g., the middleware, the API, or the application). In addition, the kernel may provide an interface for allowing the middleware, the API, or the application to access an individual element of the electronic device 100 and control or manage the element. The middleware serves as an intermediary to allow the API or the application to communicate with the kernel and exchange data with the kernel. In addition, the middleware performs load balancing with respect to work requests received from at least one application by giving priority to use the system resources of the electronic device 100 (e.g., the bus 110, the processor 120, or the memory 130). The API is an interface for allowing the application to control a function provided by the kernel or the middleware and may include at least one interface or function for controlling a file, controlling a window, processing an image, or controlling a text.

The user input module 140 receives instructions or data from a user and transmits the instructions or data to the processor 120 or the memory 130 via the bus 110. The user input module 140 may include a touch panel, a pen sensor, a key, or an ultrasonic input device.

The touch panel recognizes a touch input in at least one method of capacitive, resistive, infrared, and ultrasonic methods. In addition, the touch panel may further include a controller. In the embodiment of a capacitive method, the touch panel recognizes not only physical contact, but also hovering. The touch panel may further include a tactile layer. In this embodiment, the touch panel provides a tactile response to the user.

The pen sensor may be implemented in the same or a similar method as the method of receiving a user's touch input or may be implemented by using a separate detection sheet.

The key may include a keypad or a touch key.

The ultrasonic input device allows the electronic device 100 to detect micro-sound waves through a pen generating ultrasonic signals to identify data, and is capable of wireless recognition.

The display module 150 displays an image, a video or data. The display module 150 may include a panel or a hologram.

The panel may be a Liquid Crystal Display (LCD) or an Active Matrix Organic Light Emitting Diode (AM-OLED). In addition, the panel may be implemented to be flexible, transparent, or wearable. The panel may be configured as a single module along with the touch panel.

The hologram shows a stereoscopic image in the air using the interference of light.

Additionally, the display module 150 may further include a control circuit to control the panel or the hologram.

The display module 150 displays data under the control of the display control program 133. The display module 150 may display a thumbnail of a video content.

The communication module 160 connects communication between the electronic device 100 and other electronic devices, such as electronic device 102 and electronic device 104. The communication module 160 may support a short distance communication protocol (e.g., WiFi, Bluetooth (BT), Near Field Communication (NFC)) or network communication 162 (e.g., Internet, a Local Area Network (LAN), a Wire Area Network (WAN), a telecommunication network, a cellular network, a satellite network, or a Plain Old Telephone Service (POTS).

The electronic device 102 and the electronic device 104 may be the same device as the electronic device 100 (e.g., the same type of device) or a different device (e.g., a different type of device).

Additionally, the electronic device 100 may further include a sensor module. The sensor module may include at least one of a gesture sensor, a gyro sensor, a barometric pressure sensor, a magnetic sensor, an acceleration sensor, a grip sensor, a proximity sensor, a Red, Green, Blue (RGB) sensor, a biosensor, a temperature/humidity sensor, an illumination sensor, or a Ultraviolet (UV) sensor. The sensor module measures a physical quantity or detects an operation state of the electronic device 100, and converts measured or detected information into electric signals. For example, the sensor module may include an E-nose sensor, an electromyography (EMG) sensor, an electroencephalogram (EEG) sensor, an electrocardiogram (ECG) sensor, or a fingerprint sensor. In addition, the sensor module may further include a control circuit to control at least one sensor included therein.

The names of the hardware elements according to various embodiments of the present invention may vary according to a kind of electronic device. The hardware according to various embodiments of the present invention may include at least one of the above-described elements, and some of the elements may be omitted or an additional element may be further included. In addition, some of the elements of the hardware according to various embodiments of the present invention may be combined into a single entity, and may perform the same functions as those of the elements before being combined.

FIG. 2 is a detailed block diagram illustrating a processor of an electronic device, according to an embodiment of the present invention.

Referring to FIG. 2, the processor 120 includes a thumbnail generation module 210, a thumbnail management module 220, and a display control module 230.

The thumbnail generation module 210 executes the thumbnail generation program 131 stored in the memory 130 and controls to determine a thumbnail of a video content. Additionally, the thumbnail generation module 210 includes a video content segment division module 211, a representative frame extraction module 212, a characteristic point extraction module 213, a characteristic point comparison module 214, and a thumbnail determination module 215.

Specifically, the thumbnail generation module 210 controls the video content segment division module 211 to divide a video content on a segment basis. The video content segment division module 211 divides the video content on the segment basis by dividing the video content into sections each having a same or similar frame with reference to a continuous time axis. The video content segment separation module 211 analyzes histograms of the frames, and, when a change in the histogram between the frames exceeds a reference range, divides the video content into segments. Additionally, when the video content segment division module 211 divides the entirety of the video content on the segment basis, significant processing time is required. Therefore, the video content segment division module 211 may divide at least a part of the video content into segments.

In addition, the thumbnail generation module 210 controls the representative frame extraction module 212 to extract a representative frame for each segment. For example, the representative frame extraction module 212 analyzes the histograms of the frames included in the segment and determines a frame approximating to an average value as a representative frame. In another example, the representative frame extraction module 212 determines an n-th frame from among the frames included in the segment as a representative frame.

In addition, the thumbnail generation module 210 controls the characteristic point extraction module 213 to extract a characteristic point for each of the representative frames. For example, the characteristic point extraction module 213 extracts at least one piece of information of an object, a face, and a text existing in each of the representative frames as a characteristic point. The characteristic point extraction module 213 extracts the characteristic point from each of the representative frames by using SIFT or SURF. Additionally, the characteristic point extraction module 213 stores the characteristic point information of each of the representative frames in the thumbnail management module 220 or the segment information storage module 221. The characteristic point information includes at least one piece of information of a video content ID, a segment ID, a segment start location, a segment finish location, characteristic point information of a segment, and information on whether there is a same segment.

In addition, the thumbnail generation module 210 controls the characteristic point comparison module 214 to compare the characteristic point of each of the representative frames and a characteristic point of each of the representative frames of another video content.

In addition, the thumbnail generation module 210 controls the characteristic point comparison module 214 to determine whether common segment information. When the common segment information exists, the thumbnail generation module 201 compares the characteristic point of each of the representative frames and a characteristic point of each of the representative frames of another video content included in the common segment information. When the characteristic point of each of the representative frames is similar to the characteristic point of each of the representative frames included in the common segment information by more than a predetermined level, the characteristic point comparison program 214 recognizes that the segments are the same. When it is recognized that the segments are the same, the characteristic point comparison program 214 transmits information of the corresponding segment to the thumbnail management module 220 or to the common segment information storage module 222 to be included in the common segment information. The common segment information includes at least one of a common segment ID, a common segment video content ID, and common segment video content segment ID information.

In addition, the thumbnail generation module 210 controls the thumbnail determination module 215 to determine a thumbnail of the video content from a representative frame that is not the same as a representative frame from the other video content based on a result of the comparison transmitted from the characteristic point comparison module 214.

The thumbnail management module 220 executes the thumbnail management program 132 stored in the memory 130 to control to store segment information and common segment information accompanied by the generated thumbnail of the video content. Additionally, the thumbnail management module 220 includes a segment information storage module 221 and a common segment information storage module 222.

The thumbnail management module 220 receives characteristic point information of each of the representative frames from the characteristic point extraction module 213 and stores the same in the segment information storage module 221. The characteristic point information includes at least one piece of information of a video content ID, a segment ID, a segment start location, a segment finish location, characteristic point information of a segment, and information on whether there is a same segment.

In addition, the thumbnail management module 220 receives segment information to be included in the common segment information from the characteristic point comparison module 214 and stores the same in the common segment information storage module 222.

The display control module 230 executes the display control program 133 stored in the memory 130 to control to display data through the display module 150. For example, the display controller 220 displays the thumbnail of the video content through the display module 150.

In accordance with an aspect of the present invention, an electronic device for generating a thumbnail of a video content is provided. The electronic device includes a memory, and one or more processors. The processors configured to control to divide a video content into a plurality of pieces, extract a characteristic point of each of the plurality of pieces, compare the characteristic point of each of the plurality of pieces and a characteristic point of each of a plurality of pieces of at least one other video content, and determine a thumbnail of the video content from a piece of the video content that is not the same as a piece of the at least one other video content, based on a result of the comparing.

The processor is further configured to divide the video content on a segment basis by dividing the video content into sections each having a same or similar frame with reference to a continuous time axis.

The processor is further configured to analyze histograms of frames included in the video content, and, when a change in a histogram between the frames exceeds a reference range, divide the video content into the plurality of pieces.

The processor is further configured to divide the video content, beginning from a reference time, into only as many sections as a number of reference sections.

The processor is further configured to extract a representative frame of each of the plurality of pieces; and extract a characteristic point of the representative frame of each of the plurality of pieces.

The processor is further configured to analyze histograms of frames included in each of the plurality of pieces and determine a frame approximating to an average value as the representative frame, or determine an n-th frame from among the frames included in each of the plurality of pieces as the representative frame.

The processor is further configured to extract the characteristic point by using Scale-Invariant Feature Transform (SIFT) or Speeded Up Robust Features (SURF).

When a sum of distances between characteristic points of each of the plurality of pieces of the video content and characteristic points of each of the plurality of pieces of the at least one other video content is within a reference range, the processor is further configured to determine that corresponding pieces are the same.

When the pieces are the same, the processor is further configured to store information on the same pieces of the video content in the memory.

The processor is further configured to determine whether a common segment for the at least one other video content exists, and when the common segment exists, compare the characteristic point of each of the plurality of pieces of the video content and the characteristic point of each of the plurality of pieces of the at least one other video content comprising the common segment.

Figure 3:
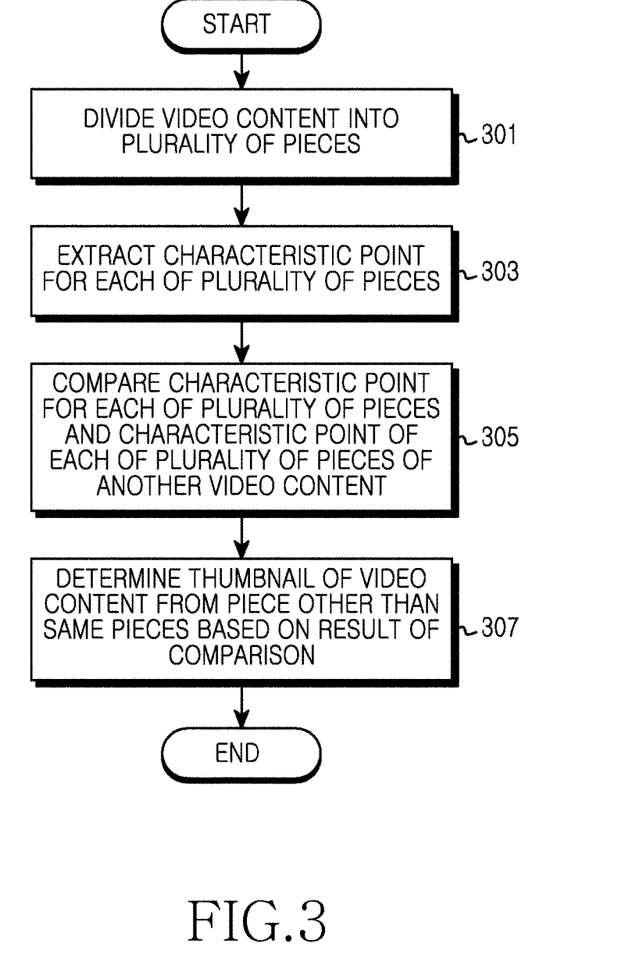
FIG. 3 is a flowchart of a procedure for determining a thumbnail of a video content in an electronic device, according to an embodiment of the present invention.

FIG. 3 is a flowchart of a procedure for determining a thumbnail of a video content in an electronic device, according to an embodiment of the present invention.

Referring to FIG. 3, the electronic device 100 divides a video content into a plurality of pieces in step 301. For example, the electronic device 100 divides the video content on a segment basis by dividing the video content into sections each having a same or similar frame with reference to a continuous time axis. The electronic device 100 analyzes histograms of the frames, and, when a change in the histogram between the frames exceeds a reference range, divides the video content into segments. Additionally, when the electronic device 100 divides the entirety of the video content on the segment basis, much significant processing time is required. Therefore, the electronic device 100 may divide only at least a part of the video content into segments.

Thereafter, in step 303, the electronic device 100 extracts a characteristic point of each of the plurality of pieces. In this case, the electronic device 100 determines a certain frame included in each of the pieces as a representative frame. The electronic device 100 extracts at least one piece of information of an object, a face, and a text existing in each of the representative frames as a characteristic point. The electronic device 100 extracts the characteristic point from each of the representative frames by using SIFT or SURF. Additionally, the electronic device 100 stores characteristic point information of each of the representative frames in the memory. The characteristic point information includes at least one piece of information of a video content ID, a segment ID, a segment start location, a segment finish location, characteristic point information of a segment, and information on whether there is a same segment.

Thereafter, in step 305, the electronic device 100 compares the characteristic point of each of the plurality of pieces and a characteristic point of each of a plurality of pieces of another video content. For example, the electronic device 100 compares the characteristic point of each of the representative frames and a characteristic point of each of the representative frames of another video content.

Thereafter, in step 307, the electronic device 100 determines a thumbnail of the video content from a representative frame that is not the same as a representative frame from the other video content, based on a result of the comparison.

Figure 4:
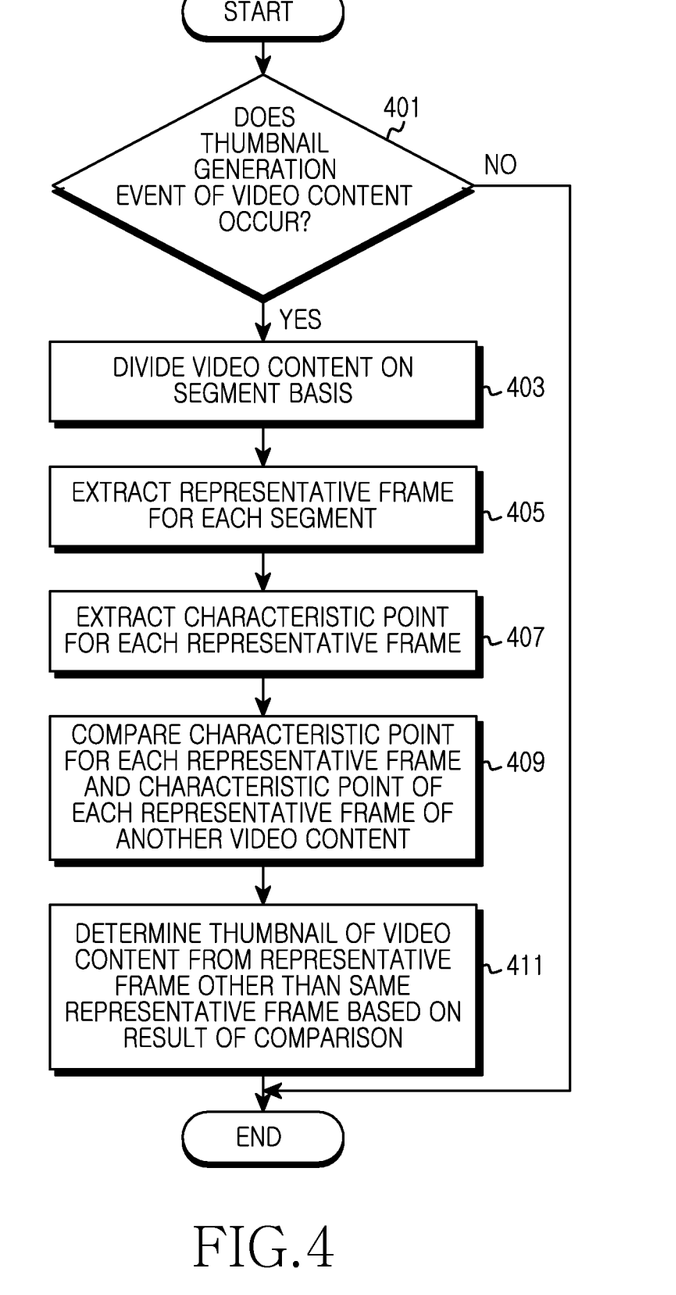
FIG. 4 is a flowchart of a procedure for determining a thumbnail by comparing a representative frame of a video content and a representative frame of another video content in an electronic device, according an embodiment of the present invention.

FIG. 4 is a flowchart of a procedure for determining a thumbnail by comparing a representative frame of a video content and a representative frame of another video content in an electronic device, according to an embodiment of the present invention.

Referring to FIG. 4, in step 401, the electronic device 100 determines whether an event for generating a thumbnail of a video content occurs. For example, the electronic device 100 may determine whether a video content is stored in the memory. In another example, the electronic device 100 may determine whether a video content without a thumbnail exists in the memory. In yet another example, the electronic device 100 may determine whether a thumbnail update event regarding a video content occurs by a user's operation.

When the thumbnail generation event occurs, in step 403, the electronic device 100 divides the video content on a segment basis. For example, the electronic device 100 divides the video content on the segment basis by dividing the video content into sections each having a same or similar frame with reference to a continuous time axis. In this case, the electronic device 100 analyzes histograms of the frames and, when a change in the histogram between the frames exceeds a reference range, divides the video content into segments. Additionally, when the electronic device 100 divides the entirety of the video content on the segment basis significant processing time is required. Therefore, the electronic device 100 may divide at least a part of the video content into segments.

Thereafter, in step 405, the electronic device 100 extracts a representative frame for each of the segments. For example, the electronic device 100 analyzes the histograms of the frames included in the segment and determines a frame approximating to an average value as a representative frame. In another example, the electronic device 100 determines an n-th frame from among the frames included in the segment as a representative frame.

Thereafter, in step 407, the electronic device 100 extracts a characteristic point for each of the representative frames. For example, the electronic device 100 extracts at least one piece of information of an object, a face, and a text existing in each of the representative frames as a characteristic point. The electronic device 100 extracts the characteristic point from each of the representative frames by using SIFT or SURF. Additionally, the electronic device 100 stores characteristic point information of each of the representative frames in the memory 130. The characteristic point information includes at least one piece of information of a video content ID, a segment ID, a segment start location, a segment finish location, characteristic point information of a segment, and information on whether there is a same segment.

Thereafter, in step 409, the electronic device 100 compares the characteristic point of each of the representative frames and a characteristic point of each of the representative frames of another video content. For example, when a sum of distances between the characteristic points of each of the representative frames and the characteristic points of each of the representative frames of another video content falls within a reference range, the electronic device 100 determines that the segments are the same.

Thereafter, in step 411, the electronic device 100 determines a thumbnail of the video content from a representative frame that is not the same as a representative frame from the other video content, based on a result of the comparison.

Figure 6:
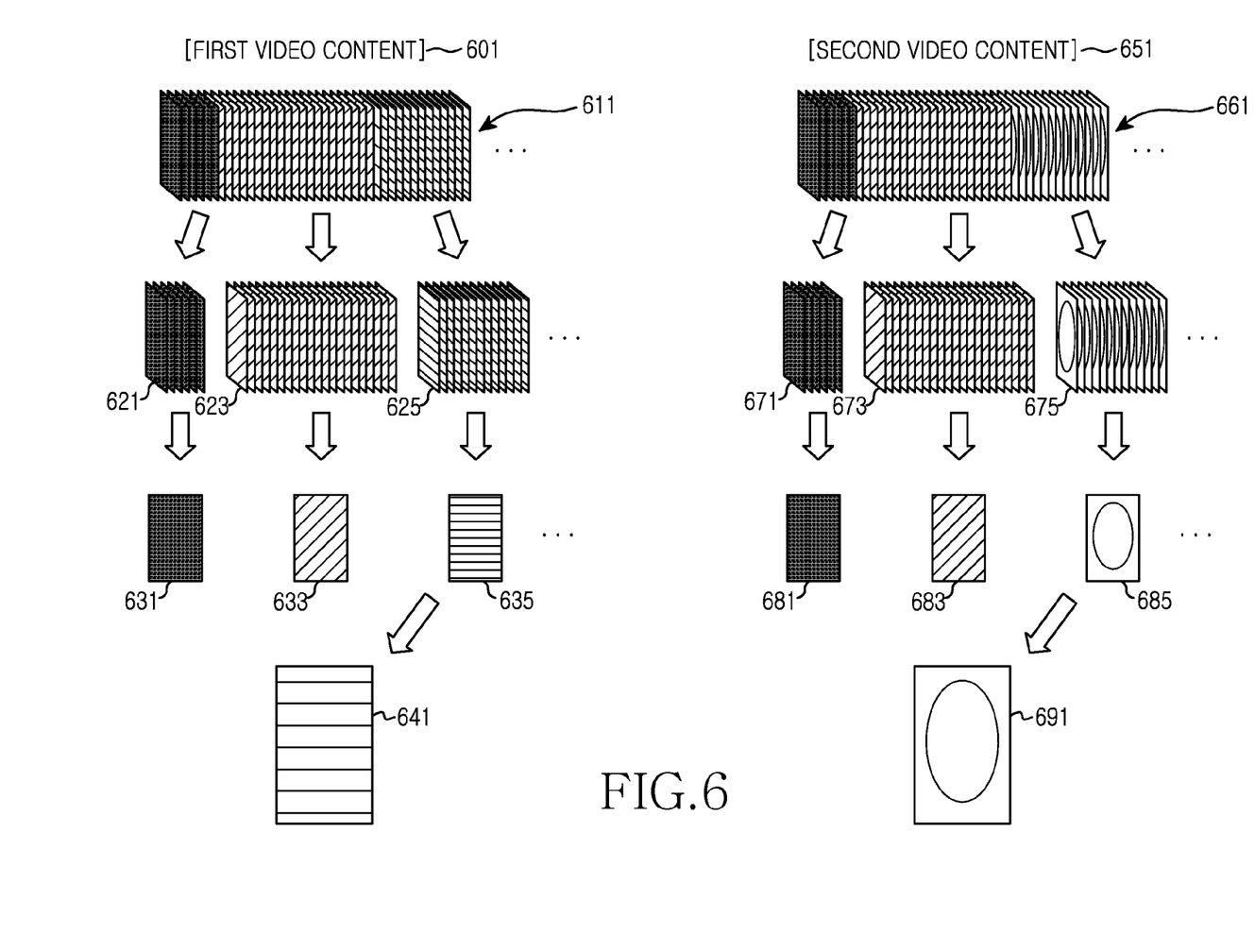
FIG. 6 illustrates a procedure for generating different thumbnails for a plurality of video contents in an electronic device, according to an embodiment of the present invention.

FIG. 6 illustrates a procedure for generating different thumbnails for a plurality of video contents in an electronic device, according to an embodiment of the present invention.

Referring to FIG. 6, when a thumbnail generation event regarding a first video content 610 and a second video content 651 occurs, the electronic device 100 divides the first video content 601 into a first segment 621, a second segment 623, and a third segment 625, and divide the second video content 651 into a fourth segment 671, a fifth segment 673, and a sixth segment 675.

Thereafter, the electronic device 100 extracts, from the first video content 601, a first representative frame 631 of the first segment 621, a second representative frame 633 of the second segment 623, and a third representative frame 635 of the third segment 625, and extracts, from the second video content 651, a fourth representative frame 681 of the fourth segment 671, a fifth representative frame 683 of the fifth segment 673, and a sixth representative frame 685 of the sixth segment 675.

After extracting the representative frames 631, 633, 635, 681, 683, and 685, the electronic device 100 extracts characteristic points of the representative frames 631, 633, 635, 681, 683, and 685.

Thereafter, the electronic device 100 compares the characteristic points of the representative frames 631, 633, and 635 of the first video content 601 and the characteristic points of the representative frames 681, 683, and 685 of the second video content 651.

Accordingly, the electronic device 100 may recognize that the first representative frame 631 and the second representative frame 633 of the first video content 601 are the same as the fourth representative frame 681 and the fifth representative frame 683 of the second video content 651, respectively. In addition, the electronic device 100 may recognize that the third representative frame 635 of the first video content 601 is different from the sixth representative frame 685 of the second video content 651.

Thereafter, since the third representative frame 635 of the first video content 601 is different from the sixth representative frame 685 of the second video content 651, the electronic device 100 determines the third representative frame 635 as a thumbnail of the first video content 601 and determine the sixth representative frame 635 as a thumbnail of the second video content 651.

Figure 5:
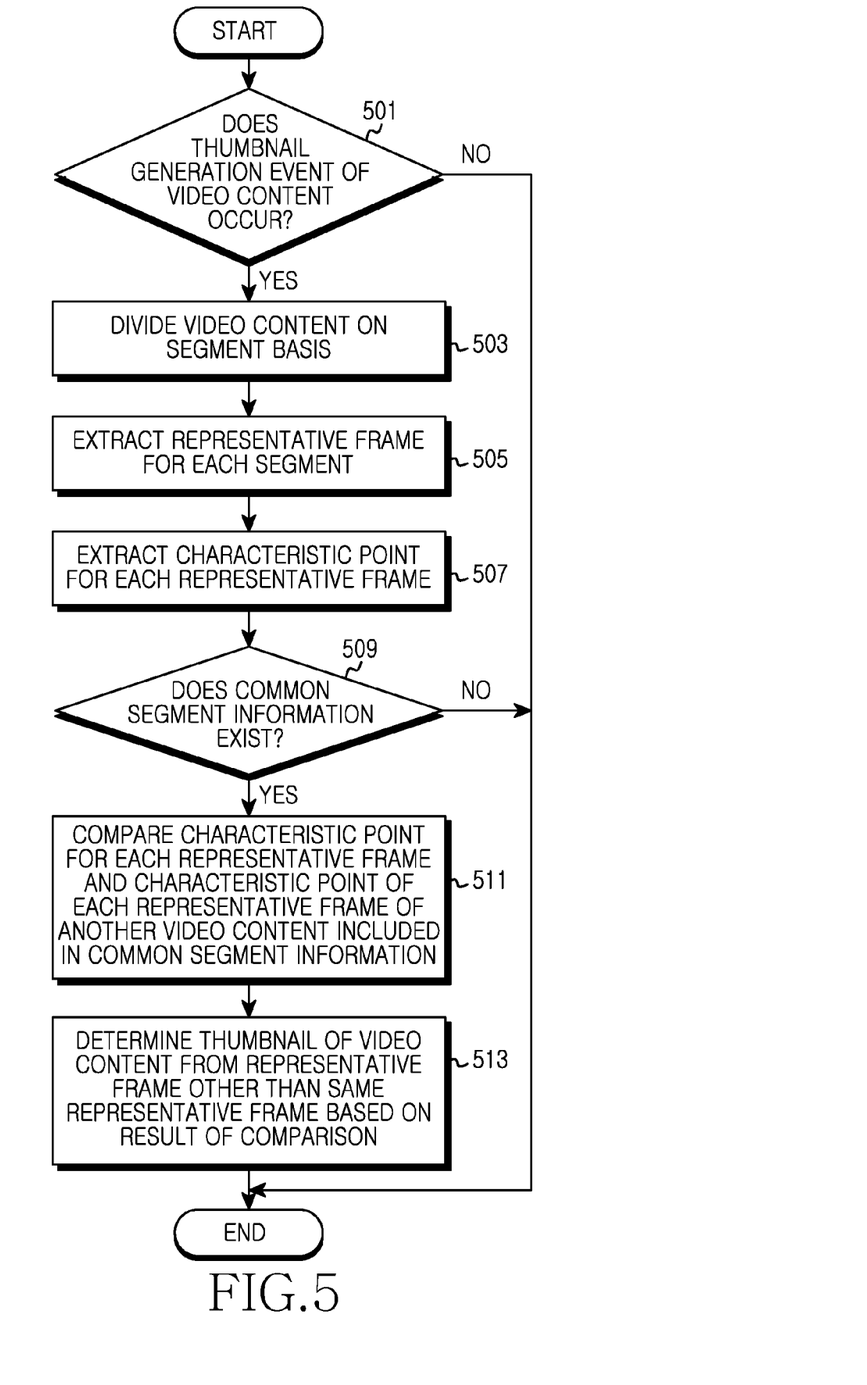
FIG. 5 is a flowchart of a procedure for determining a thumbnail by comparing a representative frame of a video content and a representative frame of another video content included in common segment information in an electronic device, according to an embodiment of the present invention.

FIG. 5 is a flowchart of a procedure for determining a thumbnail by comparing a representative frame of a video content and a representative frame of another video content included in common segment information in an electronic device, according to an embodiment of the present invention.

Referring to FIG. 5, in step 501, the electronic device 100 determines whether an event for generating a thumbnail of a video content occurs. For example, the electronic device 100 determines whether a video content is stored in the memory. In another example, the electronic device 100 determines whether a video content without a thumbnail exists in the memory. In another example, the electronic device 100 determines whether a thumbnail update event regarding a video content occurs by a user's operation.

When the thumbnail generation event occurs, in step 503, the electronic device 100 divides the video content on a segment basis. For example, the electronic device 100 divides the video content on the segment basis by dividing the video content into sections each having a same or similar frame with reference to a continuous time axis. In this case, the electronic device 100 analyzes histograms of the frames and, when a change in the histogram between the frames exceeds a reference range, divides the video content into segments. Additionally, when the electronic device 100 divides the entirety of the video content on the segment basis, significant processing time is required. Therefore, the electronic device 100 divides at least a part of the video content into segments.

Thereafter, in step 505, the electronic device 100 extracts a representative frame for each of the segments. For example, the electronic device 100 analyzes the histograms of the frames included in the segment and determines a frame approximating to an average value as a representative frame. In another example, the electronic device 100 determines an n-th frame from among the frames included in the segment as a representative frame.

Thereafter, in step 507, the electronic device 100 extracts a characteristic point for each of the representative frames. For example, the electronic device 100 extracts at least one piece of information of an object, a face, and a text existing in each of the representative frames as a characteristic point. The electronic device 100 extracts the characteristic point from each of the representative frames by using SIFT or SURF. Additionally, the electronic device 100 stores characteristic point information of each of the representative frames in the memory 130. The characteristic point information includes at least one piece of information of a video content ID, a segment ID, a segment start location, a segment finish location, characteristic point information of a segment, and information on whether there is a same segment.

Thereafter, in step 509, the electronic device 100 determines whether common segment information exists.

When the common segment information exists, in step 511, the electronic device 100 compares the characteristic point of each of the representative frames and a characteristic point of each of the representative frames of another video content included in the common segment information. When the characteristic point of each of the representative frames is similar to the characteristic point of each of the representative frames included in the common segment information by more than a predetermined level, the electronic device 100 recognizes that the segments are the same. When the segments are the same, the electronic device 100 includes information on the corresponding segment in the common segment information. The common segment information includes at least one piece of a common segment ID, a common segment video content ID, and a common segment video content segment ID.

On the other hand, when the common segment information does not exist, the electronic device 100 compares the characteristic point of each of the representative frames of the video content and the characteristic point of each of the representative frames of another video content as described with reference to the embodiment shown in FIG. 4.

Thereafter, in step 513, the electronic device 100 determines a thumbnail of the video content from a representative frame that is not the same as a representative frame from the other video content, based on a result of the comparison.

Referring back to FIG. 6, when a thumbnail generation event regarding the first video content 610 occurs, the electronic device 100 divides the first video content 601 into the first segment 621, the second segment 623, and the third segment 625.

Thereafter, the electronic device 100 extracts, from the first video content 601, the first representative frame 631 of the first segment 621, the second representative frame 633 of the second segment 623, and the third representative frame 635 of the third segment 625.

After extracting the representative frames 631, 633, and 635, the electronic device 100 extract characteristic points of the representative frames 631, 633, and 635.

Thereafter, the electronic device 100 determines whether common segment information exists in the memory 130. When the common segment information exists in the memory, the electronic device 100 compares the characteristic points of the representative frames 631, 633, and 635 of the first video content and characteristic points of representative frames of another video content included in the common segment information. Herein, it may be assumed that some segments of the second video content 651 are included in the common segment information. Accordingly, the electronic device 100 compares the characteristic points of the representative frames 631, 633, and 635 of the first video content 601 and the characteristic points of the representative frames 681, 683, and 685 of the second video content 651.

Thereafter, the electronic device 100 may recognize that the first representative frame 631 and the second representative frame 633 of the first video content 601 are the same as the fourth representative frame 681 and the fifth representative frame 683 of the second video content 651, respectively, included in the common segment information. In addition, the electronic device 100 may recognize that the third representative frame 635 of the first video content 601 is different from the sixth representative frame 685 of the second video content 651.

Thereafter, since the third representative frame 635 of the first video content 601 is different from the sixth representative frame 685 of the second video content 651 included in the common segment information, the electronic device 100 determines the third representative frame 635 as a thumbnail of the first video content 601.

Figure 7B:
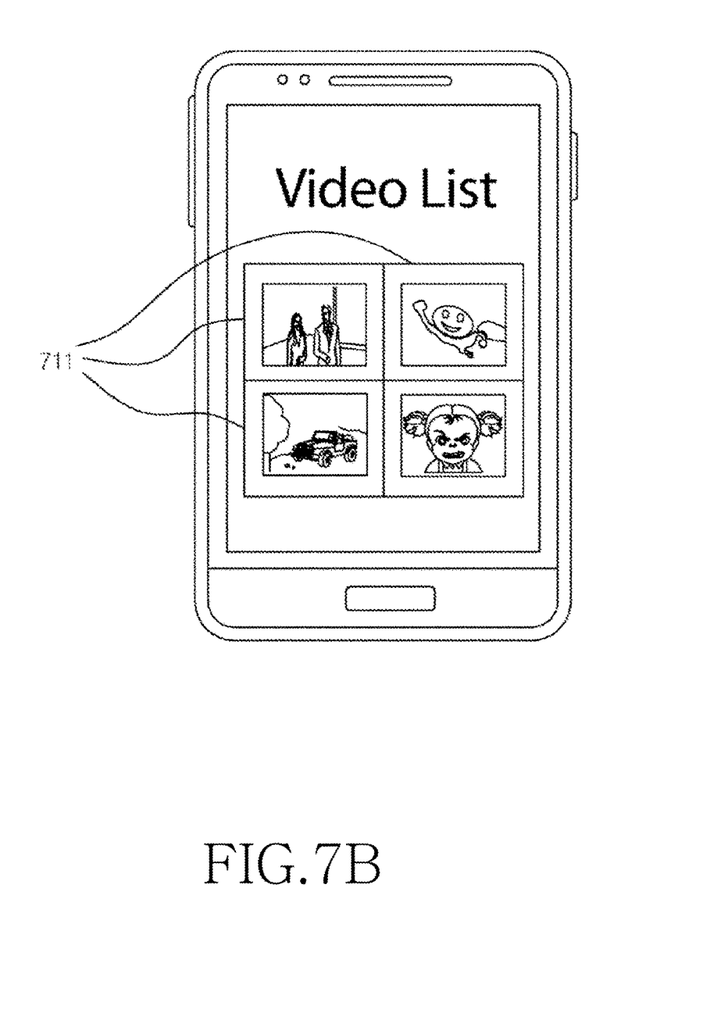
FIG. 7B illustrates a screen of an electronic device on which different thumbnail images are generated for a series of video contents, according to an embodiment of the present invention.

FIG. 7B illustrates a screen of an electronic device on which different thumbnail images are generated for a series of video contents, according to an embodiment of the present invention Referring to FIG. 7B, the electronic device 100 may divide each of a series of video contents and generate different thumbnails by comparing them, so that the user can easily identify a series of video contents.

In accordance with an aspect of the present invention, a method for generating a thumbnail of a video content in an electronic device is provided. The method includes dividing a video content into a plurality of pieces, extracting a characteristic point of each of the plurality of pieces, comparing the characteristic point of each of the plurality of pieces and a characteristic point of each of a plurality of pieces of at least one other video content, and determining a thumbnail of the video content from a piece of the video content that is not the same as a piece of the at least one other video content, based on a result of the comparing.

Dividing the video content into the plurality of pieces comprises dividing the video content on a segment basis by dividing the video content into sections each having a same or similar frame with reference to a continuous time axis.

Dividing the video content into the plurality of pieces comprises analyzing histograms of frames included in the video content, and, when a change in a histogram between the frames exceeds a reference range, dividing the video content into the plurality of pieces.

Dividing the video content into the plurality of pieces comprises dividing the video content, beginning from a reference time, into only as many sections as a number of reference sections.

Extracting the characteristic point comprises extracting a representative frame of each of the plurality of pieces, and extracting a characteristic point of the representative frame of each of the plurality of pieces.

Extracting the representative frame comprises analyzing histograms of frames included in each of the plurality of pieces and determining a frame approximating to an average value as the representative frame, or determining an n-th frame from among the frames included in each of the plurality of pieces as the representative frame.

Extracting the characteristic point comprises extracting the characteristic point by using Scale-Invariant Feature Transform (SIFT) or Speeded Up Robust Features (SURF).

Comparing the characteristic point comprises, when a sum of distances between characteristic points of each of the plurality of pieces of the video content and characteristic points of each of the plurality of pieces of the at least one other video content is within a reference range, determining that corresponding pieces are the same; and when the pieces are the same, storing information on the same pieces of the video content.

Comparing the characteristic point comprises determining whether a common segment for the at least one other video content exists, and when the common segment exists, comparing the characteristic point of each of the plurality of pieces of the video content and the characteristic point of each of the plurality of pieces of the at least one other video content comprising the common segment.

It will be appreciated that embodiments of the present invention according to the claims and disclosure herein can be realized in the form of hardware, software, or a combination of hardware and software.

Any such software may be stored in a non-transitory computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium, such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments of the present invention provide a program comprising code for implementing an apparatus or a method of the present invention and a machine-readable storage storing such a program. Still further, such programs may be conveyed electronically via any medium such as a communication signal carried over a wired or wireless connection.

In accordance with an aspect of the present invention, a non-transitory computer-readable storage medium may be provided, with a program stored thereon with instructions for executing the steps of dividing a video content into a plurality of pieces, extracting a characteristic point of each of the plurality of pieces, comparing the characteristic point of each of the plurality of pieces and a characteristic point of each of a plurality of pieces of at least one other video content, and determining a thumbnail of the video content from a piece of the video content that is not the same as a piece of the at least one other video content, based on a result of the comparing.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims and their equivalents, and all differences within the scope will be construed as being included in the present disclosure.

What is claimed is:

1. A method of an electronic device, the method comprising:
   acquiring a video content comprising a plurality of pieces;
   identifying, among the plurality of pieces of the video content, a piece having a characteristic point different from each of characteristic points of a plurality of pieces of at least one other video content than a predetermined level;
   displaying a thumbnail of the video content generated based on the identified piece,
   wherein identifying the piece having the characteristic point comprises:

determining whether a common segment within the at least one other video content exists; and if the common segment exists, comparing a characteristic point of each of the plurality of pieces of the video content and a characteristic point of each of the plurality of pieces of the at least one other video content comprising the common segment.

2. The method of claim 1, wherein the video content is divided into the plurality of pieces on a segment basis by dividing the video content into sections each having a same or similar frame with reference to a continuous time axis.

3. The method of claim 1, wherein the video content is divided into the plurality of pieces by analyzing histograms of frames included in the video content, and by segmenting the video content into the plurality of pieces when a change in a histogram between the frames exceeds a reference range.

4. The method of claim 1, wherein the video content is divided into the plurality of pieces comprises by segmenting the video content, beginning from a reference time, into only as many sections as a number of reference sections.

5. The method of claim 1, wherein identifying the characteristic point comprises:

extracting a representative frame of each of the plurality of pieces; and extracting a characteristic point of the representative frame of each of the plurality of pieces.

6. The method of claim 5, wherein extracting the representative frame comprises analyzing histograms of frames included in each of the plurality of pieces and determining a frame approximating to an average value as the representative frame, or determining an n-th frame from among the frames included in each of the plurality of pieces as the representative frame.

7. The method of claim 1, wherein the piece having the characteristic point is identified by using Scale-Invariant Feature Transform (SIFT) or Speeded Up Robust Features (SURF).

8. The method of claim 1, wherein identifying the piece having the characteristic point comprises, when a sum of differences between the characteristic point of the piece of the video content and a characteristic point of another piece among the plurality of pieces of the at least one other video content is within the predetermined level, determining that the piece of the video content and the other piece of the at least one other video content are the same.

9. The method of claim 8, further comprising, storing information on the same pieces of the video content.

10. An electronic device, comprising:
a display;
a memory; and
one or more processors configured to:
acquire a video content comprising a plurality of pieces,
identify, among the plurality of pieces of the video content, a piece having a characteristic point different from each of characteristic points of a plurality of pieces of at least one other video content than a predetermined level, and
control the display to display a thumbnail of the video content generated based on the identified piece,
wherein the one or more processors are further configured to identify the piece having the characteristic point by:
determining whether a common segment within the at least one other video content exists, and
if the common segment exists, comparing a characteristic point of each of the plurality of pieces of the video content and a characteristic point of each of the plurality of pieces of the at least one other video content comprising the common segment.

11. The electronic device of claim 10, wherein the video content is divided into the plurality of pieces on a segment basis by dividing the video content into sections each having a same or similar frame with reference to a continuous time axis.

12. The electronic device of claim 10, wherein the video content is divided into the plurality of pieces by analyzing histograms of frames included in the video content, and by segmenting the video content into the plurality of pieces when a change in a histogram between the frames exceeds a reference range.

13. The electronic device of claim 10, wherein the video content is divided into the plurality of pieces, beginning from a reference time, by segmenting the video content into only as many sections as a number of reference sections.

14. The electronic device of claim 10, wherein the processor is further configured to extract a representative frame of each of the plurality of pieces; and extract a characteristic point of the representative frame of each of the plurality of pieces.

15. The electronic device of claim 14, wherein the processor is further configured to analyze histograms of frames included in each of the plurality of pieces and determine a frame approximating to an average value as the representative frame, or determine an n-th frame from among the frames included in each of the plurality of pieces as the representative frame.

16. The electronic device of claim 10, wherein the piece having the characteristic point is identified by using Scale-Invariant Feature Transform (SIFT) or Speeded Up Robust Features (SURF).

17. The electronic device of claim 10, wherein, when a sum of differences between the characteristic point of the piece of the video content and a characteristic point of another piece among the plurality of pieces of the at least one other video content is within a predetermined level, the processor is further configured to determine that the piece of the video content and the other piece of the at least one other video content are the same.

18. The electronic device of claim 17, wherein, the processor is further configured to store information on the same pieces of the video content in the memory.

* * * * *